United States Patent
Hegde et al.

(10) Patent No.: US 9,729,451 B2
(45) Date of Patent: Aug. 8, 2017

(54) MANAGING ROUTING INFORMATION IN A HUB-AND-SPOKES NETWORK

(71) Applicant: Juniper Networks, Inc., Sunnyvale, CA (US)

(72) Inventors: Shraddha Hegde, Bangalore (IN); Salih K A, Thodupuzha (IN)

(73) Assignee: Juniper Networks, Inc., Sunnyvale, CA (US)

( * ) Notice: Subject to any disclaimer, the term of this patent is extended or adjusted under 35 U.S.C. 154(b) by 72 days.

(21) Appl. No.: 14/657,147

(22) Filed: Mar. 13, 2015

(65) Prior Publication Data

US 2016/0261506 A1 Sep. 8, 2016

Related U.S. Application Data

(60) Provisional application No. 62/129,496, filed on Mar. 6, 2015.

(51) Int. Cl.
*H04L 12/28* (2006.01)
*H04L 12/803* (2013.01)
(Continued)

(52) U.S. Cl.
CPC ............ *H04L 47/125* (2013.01); *H04L 45/02* (2013.01); *H04L 45/025* (2013.01); *H04L 45/04* (2013.01)

(58) Field of Classification Search
CPC ......... H04L 45/02; H04L 45/04; H04L 45/10; H04L 12/66; H04L 2012/46;
(Continued)

(56) References Cited

U.S. PATENT DOCUMENTS

| 7,184,437 B1 | 2/2007 | Cole et al. |
| 7,334,047 B1 * | 2/2008 | Pillay-Esnault ........ H04L 45/02 709/239 |

(Continued)

OTHER PUBLICATIONS

Hanna et al. "Auto Discovery VPN Problem Statement and Requirements" draft-ietf-ipsecme-p2p-vpn-problem-02, IPsecME Working Group, Internet-Draft, Jul. 10, 2012, 14 pgs.

(Continued)

*Primary Examiner* — Brenda H Pham
(74) *Attorney, Agent, or Firm* — Shumaker & Sieffert, P.A.

(57) ABSTRACT

In general, techniques are described for managing routing information in a hub-and-spoke network in a manner that reduces flooding of link information. A hub router of the hub-and-spoke network including a memory and a processor may perform the techniques. The memory may be configured to store a representation of a topology of the hub-and-spoke network. The processor may be configured to utilize a separate instance of a multi-instance version of a link state protocol to communicate with each of a plurality of spoke routers of the hub-and-spoke network. Each separate instance of the multi-instance version of the link state protocol may include the hub router and a different one of the plurality of spoke routers. The processor may process link state advertisements from the separate instances of the multi-instance version of the link state protocol to maintain the representation of the topology of the hub-and-spoke network.

26 Claims, 7 Drawing Sheets

(51) Int. Cl.
H04L 12/751 (2013.01)
H04L 12/715 (2013.01)

(58) Field of Classification Search
CPC ............. H04L 2012/5618; H04L 12/46; H04L 12/4625; H04L 12/462; H04L 12/40097; H04L 12/40091; H04L 12/56; H04L 2012/05
USPC ....... 370/400, 401, 402, 389, 373, 377, 384, 370/396, 395.3, 395.32
See application file for complete search history.

(56) References Cited

U.S. PATENT DOCUMENTS

| | | | |
|---|---|---|---|
| 8,260,922 B1* | 9/2012 | Aggarwal | H04L 45/24 709/226 |
| 8,339,939 B2 | 12/2012 | Csaszar et al. | |
| 2009/0041037 A1 | 2/2009 | Yang et al. | |
| 2009/0157901 A1* | 6/2009 | Asati | H04L 29/12386 709/238 |
| 2013/0266012 A1 | 10/2013 | Dutta et al. | |
| 2014/0010117 A1* | 1/2014 | Lindem, III | H04L 45/025 370/255 |

OTHER PUBLICATIONS

Lindem et al. "OSPFv2 Multi-Instance Extensions" Internet Engineering Task Force, RFC 6549, Mar. 2012, 9 pgs.
Moy, J. "OSPF Version 2" Network Working Group, RFC 2328, Apr. 1998, 244 pages.
Raza et al. "OSPF Stub Neighbors" draft-raza-ospf-stub-neighbor-00, Network Working Group, Internet-Draft, Jul. 16, 2013, 11 pgs.
Sathyanarayan et al. "Auto Discovery VPN Protocol" draft-sathyanarayan-ipsecme-advpn-00, IPSECME Working Group, Internet Draft, Jul. 5, 2013, 46 pgs.
Smirnov, A. "OSPF for large-scale networks with regular topologies" draft-smirnov-ospf-dive-00, OSPF, Internet-Draft, Oct. 15, 2014, 23 pgs.
Extended Search Report from counterpart European Application No. 16158414.9, dated Jul. 5, 2016, 9 pp.
Response to Communication pursuant to Rule 69 EPC dated Sep. 12, 2016, from counterpart European Application No. 16158414.9, filed on Mar. 3, 2017, 25 pp.

* cited by examiner

MANAGING ROUTING INFORMATION IN A HUB-AND-SPOKES NETWORK

PRIORITY CLAIM

This application claims the benefit of U.S. Provisional Application No. 62/129,496, filed Mar. 6, 2015, the entire content of which is incorporated herein by reference.

TECHNICAL FIELD

The invention relates to the routing of packets within a network, and more particularly, to the management of routing information by routers within a hub-and-spoke network.

BACKGROUND

A private network may include a number of devices, such as computers, owned or administered by a single enterprise. These devices may be grouped into a number of site networks, which in turn may be geographically distributed over a wide area. Each site network may include one or more local area networks (LANs).

In order to maintain the privacy of the communications between these site networks, interconnection of these site networks has been accomplished using dedicated communication lines leased from a service provider. With the advent of Virtual Private Network (VPN) technology, enterprises can now accomplish private connectivity between site networks over a public network, such as the Internet. By eliminating the need for dedicated lines between the site networks, VPNs yield substantial cost savings as compared to traditional private networks.

A VPN may be configured in a hub-and-spokes topology. In a hub-and-spokes network, a hub facilitates communication between spoke site networks. This configuration passes all data through the central hub, isolating the spoke site networks, and allowing communication between devices within different spoke site networks only through the hub. An enterprise may configure a VPN used by the enterprise in this manner in order to monitor or control communications between devices within different spoke site networks.

Generally, each site network of a VPN connects to the public network via at least one spoke router on the public network administered by a provider of the VPN service. A router in the public network administered by the VPN service may act as the hub for each of the spoke routers to which the spoke site networks interconnect. The spoke routers may communicate changes in the topology of the spoke site networks via a link state protocol, such as the Open Shortest Path First (OSPF) protocol or the Intermediate-System-to-Intermediate-System (IS-IS) protocol.

According to the link state protocol, the spoke routers may flood link state advertisements communicating the topology changes via the hub router to each of the other spoke routers so that each of the spoke routers may maintain an accurate topology of the hub-and-spoke network. Given the increased deployment of hub-and-spoke networks along with the increasing number of spokes, the spoke routers may receive increasing numbers of link state advertisements. The increasing numbers of link state advertisements may result in the spoke routers consuming significant resources in terms of processing cycles and memory to process the link state advertisements and maintain the topology of the spoke site network of the hub-and-spoke network.

SUMMARY

In general, techniques are described that may be used by routing devices, such as routers, to deploy link state protocols in hub-and-spoke networks in a manner that reduces the flooding of link state advertisements. According to the techniques of this disclosure, a hub router of a hub-and-spoke network may deploy a multi-instance form of the link state protocol, such as multi-instance Open Shortest Path First (OSPF) protocol. To support the multi-instance OSPF, a logical or physical interface of the hub router may be configured to support a point-to-multi-point (P2MP) connection. The P2MP interface may further be configured to support a separate routing instance, i.e., routing domain of the multi-instance OSPF protocol, for each interface of the P2MP interface. Each instance of the multi-instance OSPF protocol may be configured, within the hub router, to include the hub router and a different one of the spoke routers. Because each instance of the multi-instance OSPF protocol is a separate routing domain from one another, the spoke routers only flood link state advertisements to the hub router, and the link state advertisements are not flooded to those spoke routers participating in the different OSPF routing instances. In this respect, the number of link state advertisements flooded between spoke routers is reduced and potentially eliminated.

The hub router may maintain the topology of the hub-and-spoke network (which may include spoke site networks) by aggregating the topology changes advertised via the link state advertisements from each spoke router. Moreover, as described herein, the hub router may easily identify to which routing instance of the OSPF protocol any given one of the link state advertisements corresponds by the source router identifier (e.g., an Internet protocol address assigned to the spoke router) and the destination router identifier (e.g., an Internet protocol address assigned to the hub router) specified in the link state advertisement. The hub router, based on the router identifiers, may update the appropriate portion of the topology associated with the spoke router to reflect the topology change specified by the link state advertisement. The spoke routers may also be configured to forward all outbound traffic (which may refer to traffic destined for destinations outside of the spoke site network) to the hub router. The hub router may forward this outbound traffic to its intended destination based on the determined topology. In this way, the techniques may allow for reduced flooding of link state advertisements while also enabling outbound traffic to be forwarded to the intended destination using the hub-and-spoke model.

In one aspect, a method comprises configuring a hub router acting as a hub in a hub-and-spoke network to utilize a separate instance of a multi-instance version of a link state protocol to communicate with each of a plurality of spoke routers of the hub-and-spoke network, each separate instance of the multi-instance version of the link state protocol corresponding to a different routing domain and including the hub router and a different one of the plurality of spoke routers, and processing, by the hub router, link state advertisements from the separate instances of the multi-instance version of the link state protocol to maintain a representation of a topology of the hub-and-spoke network.

In another aspect, a hub router configured to act as a hub in a hub-and-spoke network, the hub router comprises a memory configured to store a representation of a topology of the hub-and-spoke network, and one or more processors configured to utilize a separate instance of a multi-instance version of a link state protocol to communicate with each of a plurality of spoke routers of the hub-and-spoke network, each separate instance of the multi-instance version of the link state protocol corresponding to a different routing domain and including the hub router and a different one of the plurality of spoke routers, and process link state advertisements from the separate instances of the multi-instance version of the link state protocol to maintain the representation of the topology of the hub-and-spoke network.

In another aspect, a non-transitory computer-readable storage medium has stored thereon instructions that, when executed, cause one or more processors to configure a hub router acting as a hub in a hub-and-spoke network to utilize a separate instance of a multi-instance version of a link state protocol to communicate with each of a plurality of spoke routers of the hub-and-spoke network, each separate instance of the multi-instance version of the link state protocol corresponding to a different routing domain and including the hub router and a different one of the plurality of spoke routers, receive link state advertisements from the separate instances of the multi-instance version of the link state protocol, identify to which of the separate instances each of the link state advertisements corresponds based on a source router identifier and a destination router identifier specified by each of the link state advertisements and not based on a separate instance identifier, and process the link state advertisements to maintain a representation of a topology of the hub-and-spoke network.

In another aspect, a system comprises a hub router configured to act as a hub in a hub-and-spoke network, and a plurality of spoke routers, each of which is configured to act as a spoke in the hub-and-spoke network. The hub router includes a memory configured to store a representation of a topology of the hub-and-spoke network. The hub router also includes one or more processors configured to utilize a separate instance of a multi-instance version of a link state protocol to communicate with each of the plurality of spoke routers of the hub-and-spoke network, each separate instance of the multi-instance version of the link state protocol corresponding to a different routing domain and including the hub router and a different one of the plurality of spoke routers, and process link state advertisements from the separate instances of the multi-instance version of the link state protocol to maintain the representation of the topology of the hub-and-spoke network.

The details of one or more embodiments of the techniques are set forth in the accompanying drawings and the description below. Other features, objects, and advantages of the techniques will be apparent from the description and drawings, and from the claims.

BRIEF DESCRIPTION OF DRAWINGS

FIG. 4-7B are block diagrams illustrating various example virtual private networks (VPNs) configured in a hub-and-spokes topology.

DETAILED DESCRIPTION

Figure 1:
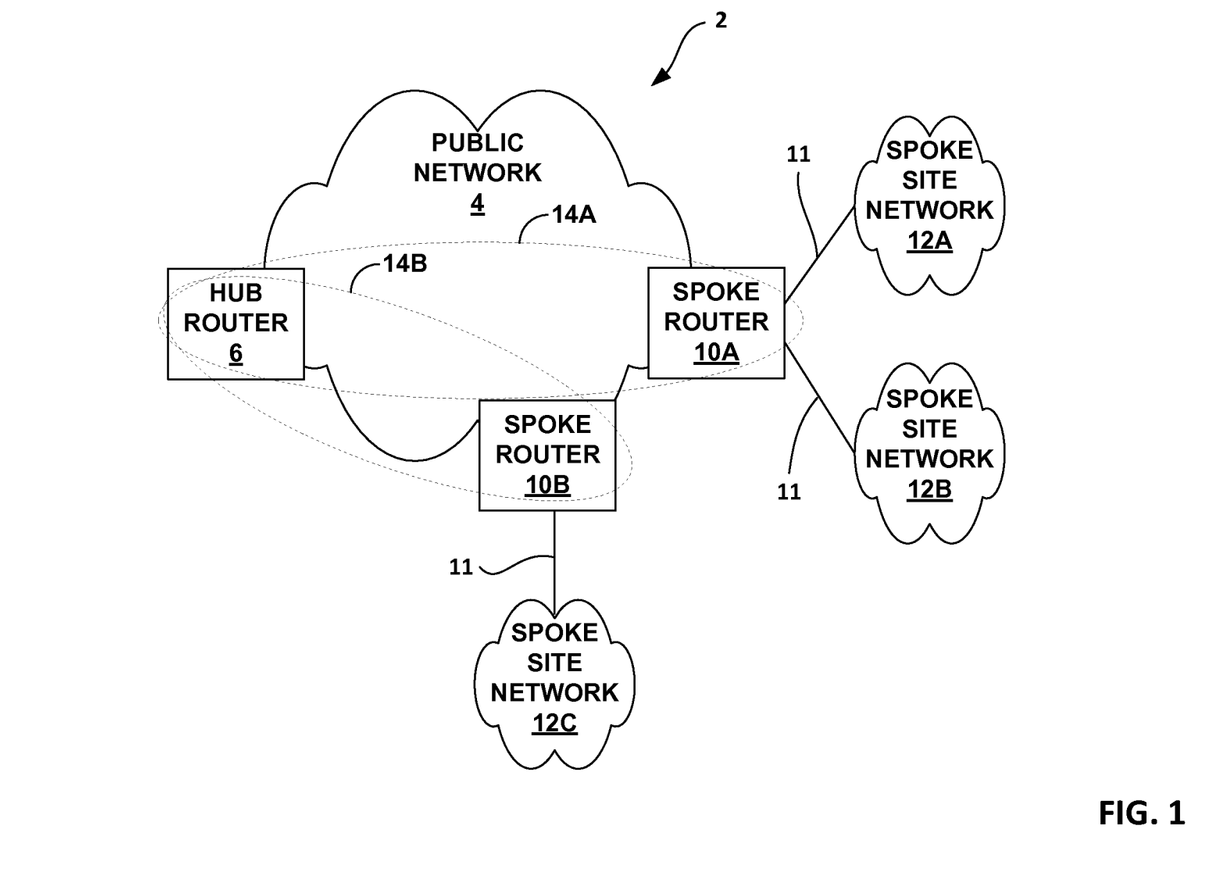
FIG. 1 is a block diagram illustrating an example virtual private network (VPN) configured in a hub-and-spokes topology.

FIG. 1 is a block diagram illustrating an example virtual private network (VPN) 2 configured in a hub-and-spokes topology. VPN 2 includes spoke site networks 12A-12C ("spoke site networks 12") connected to a public network 4. Spoke site networks 12 may be the geographically distributed sites of an enterprise. Although VPN 2 may include any number of spoke site networks 12, FIG. 1, for simplicity, shows only spoke site networks 12. Given the hub-and-spoke configuration of VPN 2, VPN 2 may also be referred to as a "hub-and-spoke VPN 2" or "hub-and-spoke network 2."

Public network 4 may include one or more autonomous systems (not shown), and may represent the Internet. Public network 4 may include a number of devices (not shown), such as routers and switches, used to route packets from point to point across public network 4. The enterprise associated with VPN 2 may utilize public network 4 to route packets between geographically distributed site networks 12.

Each of spoke site networks 12 may include one or more devices (not shown), such as personal computers, laptop computers, handheld computers, workstations, servers, routers, switches, printers, fax machines, or the like. Each of spoke site networks 12 may include one or more Local Area Networks (LANs) (not shown).

As shown in FIG. 1, spoke site networks 12 may be connected to public network 4 via spoke routers 10A and 10B ("spoke routers 10"). Spoke site networks 12 may be considered to be edge networks of public network 4. Hub router 6 and spoke routers 10A and 10B may be considered edge routers within public network 4. Further, hub router 6 and spoke routers 10A and 10B may be administered by the entity, e.g., the service provider, that provides VPN services to the enterprise that includes spoke site networks 12. Although the provider may provide more than one VPN utilizing routers 6 and 10, and many providers may provide VPN services utilizing public network 4, FIG. 1 for simplicity shows only VPN 2.

Each of spoke site networks 12 may, as shown in FIG. 1, connect to public network 4 via one of spoke routers 10, or may be connected to public network 4 via multiple spoke routers 10. As shown in FIG. 1, multiple spoke site networks 12A and 12B may be connected to a single spoke router 10A. Although, as will be discussed below, spoke site networks 12 may also be connected to public network 4 via hub router 6, FIG. 1, for simplicity, shows only spoke site networks 12 connected to public network 4 via spoke routers 10. Further, although any number of spoke site networks 12 may be connected to either of spoke routers 10A and 10B or hub router 8, FIG. 1 for simplicity shows only spoke site networks 12A and 12B connected to public network 4 via spoke router 10A, and spoke site network 12C connected to public network 4 via spoke router 10B.

Each of spoke site networks 12 may be connected to spoke site routers 10A and 10B, via one or more access links 11. One or more access links 11 may connect hub router 6 and spoke routers 10 to one or more gateway devices (not shown), such as routers, within spoke site networks 12. Access links 11 may be PPP links, ATM links, Ethernet links, Frame Relay link, GRE tunnels, or the like. Furthermore, routers 6 and 10 may connect to gateway devices and to public network 4 via one or more physical or logical interfaces (not shown) of routers 6 and 10. Network interface cards of routers 6 and 10 may provide the physical or logical interfaces. Each access link 11 may correspond to a physical or logical interface of routers 6 and 10.

In general, routers 6 and 10 are used to facilitate the routing of packets between site networks 12 of VPN 2, i.e., packets sent from a first device within one of site networks 12 to a second device within another of site networks 12.

Each of routers 6 and 10 may include a control unit (not shown) configured to cause each of routers 6 and 10 to execute the functions ascribed to routers 6 and 10 herein. The control units may be microprocessors, or the like. The control units of routers 6 and 10 may execute application program code (or, in other words, instructions) stored to a non-transitory computer-readable medium, such as RAM, ROM, CD-ROM, magnetic disk or tape, EEPROM, or the like, available locally or via a network connection, that cause the routers 6 and 10 to execute the functions ascribed to routers 6 and 10 herein.

Routers 6 and 10 may exchange link information with one another in accordance with a link state protocol, such as Open Shortest Path First (OSPF) or an Intermediate System-to-Intermediate System (IS-IS). In accordance with OSPF for example, spoke router 10A may flood link information regarding links within spoke site networks 12A and 12B to the other routers participating in VPN 2, i.e., spoke router 10B and hub router 6 in the example of FIG. 1. Likewise, spoke router 10B may flood link information regarding links within spoke site network 12C to spoke router 10B and hub router 6. Spoke routers 10 may also flood link information regarding links 11 by which spoke routers 10 communicate with spoke site networks 12B. Spoke routers 10 may flood the link information using link state advertisements (LSAs), which describe changes to links within VPN 2.

Given the recent growth in size and scale of hub-and-spoke-type networks, the amount of link information being flooded via VPN 12 to communicate the changes of a link status has grown dramatically. Change in one route or link at one of spoke site network 12, in other words, may result in link information regarding this change being flooded to all of the other ones of spoke site networks 12. Moreover, emerging ways by which to establish dynamic tunnels between spokes based on demand are being developed where tunnels are dynamically established and torn down on demand. Establishment of a tunnel and successive tear down of the tunnel results in additional flooding of link information as the tunnel is determined to be a new link by OSPF (or any other link state protocol, such as IS-IS) when established and as a broken link when torn down. Spoke routers 10 may detect the tunnel status changes, generate an LSA and flood this LSA with the link information regarding the tunnel to all of the other ones of spoke routers 10, further increasing the amount of link information flooded throughout VPN 2.

In accordance with the techniques described in this disclosure, routers 6 and 10 may deploy link state protocols in hub-and-spoke VPN 2 in a manner that reduces the flooding of link state advertisements. According to the techniques of this disclosure, hub router 6 of hub-and-spoke network 2 may deploy a multi-instance form of a link state protocol, such as multi-instance Open Shortest Path First (OSPF) protocol. More information regarding multi-instance OSPF is provided in request for comments (RFC) 6549, entitled "OSPFv2 Multi-Instance Extensions," dated March 2012, the entire contents of which are incorporated by reference as if set forth fully herein. To support the multi-instance OSPF, a logical or physical interface of hub router 6 may be configured to support a point-to-multi-point (P2MP) connection. The P2MP interface may further be configured to support each instance of the multi-instance OSPF protocol.

Each OSPF routing instance corresponds to a different interior gateway protocol (IGP) routing domain, and each OSPF routing domain for the respective OSPF instances is shown in the example of FIG. 1 as instance 14A and 14B (which may be referred to collectively as "instances 14").

Each one of instances 14 may be configured, within hub router 10, to include hub router 6 and a different one of spoke routers 10. In the example of FIG. 1, instance 14A includes hub router 6 and spoke router 10A, while instance 14B includes hub router 6 and spoke router 10B. Because each one of instances 14 of the multi-instance OSPF protocol is separate from one another, spoke routers 10 may only flood link state advertisements to hub router 6 and not to those of spoke routers 10 participating in separate OSPF instances 14. In this respect, the number of link state advertisements flooded between spoke routers 10 is reduced and potentially eliminated.

Hub router 6 may maintain the topology of hub-and-spoke VPN 2 (which may include spoke site networks 12) by aggregating the topology changes advertised via the LSAs from each spoke router. Hub router 6 may identify to which one of instances 14 of the OSPF protocol any given one of the LSAs corresponds by the source router identifier (e.g., an Internet protocol address assigned to the respective one of spoke routers 12) and the destination router identifier (e.g., an Internet protocol address assigned to hub router 6) specified in the LSA. Hub router 6, based on the source and destination router identifiers, may identify the appropriate portion of the topology associated with the respective one of spoke routers 10 to be updated based on the topology change specified in the corresponding LSA. The spoke routers 10 may also be configured to forward all outbound traffic (which may refer to traffic destined for destinations outside of the spoke site networks 12) to hub router 10. Hub router 6 may forward this outbound traffic to its intended destination based on the topology. In this way, the techniques may allow for reduced flooding of link state advertisements while also enabling outbound traffic to be forwarded to its intended destination using the hub-and-spoke model.

Figure 2:
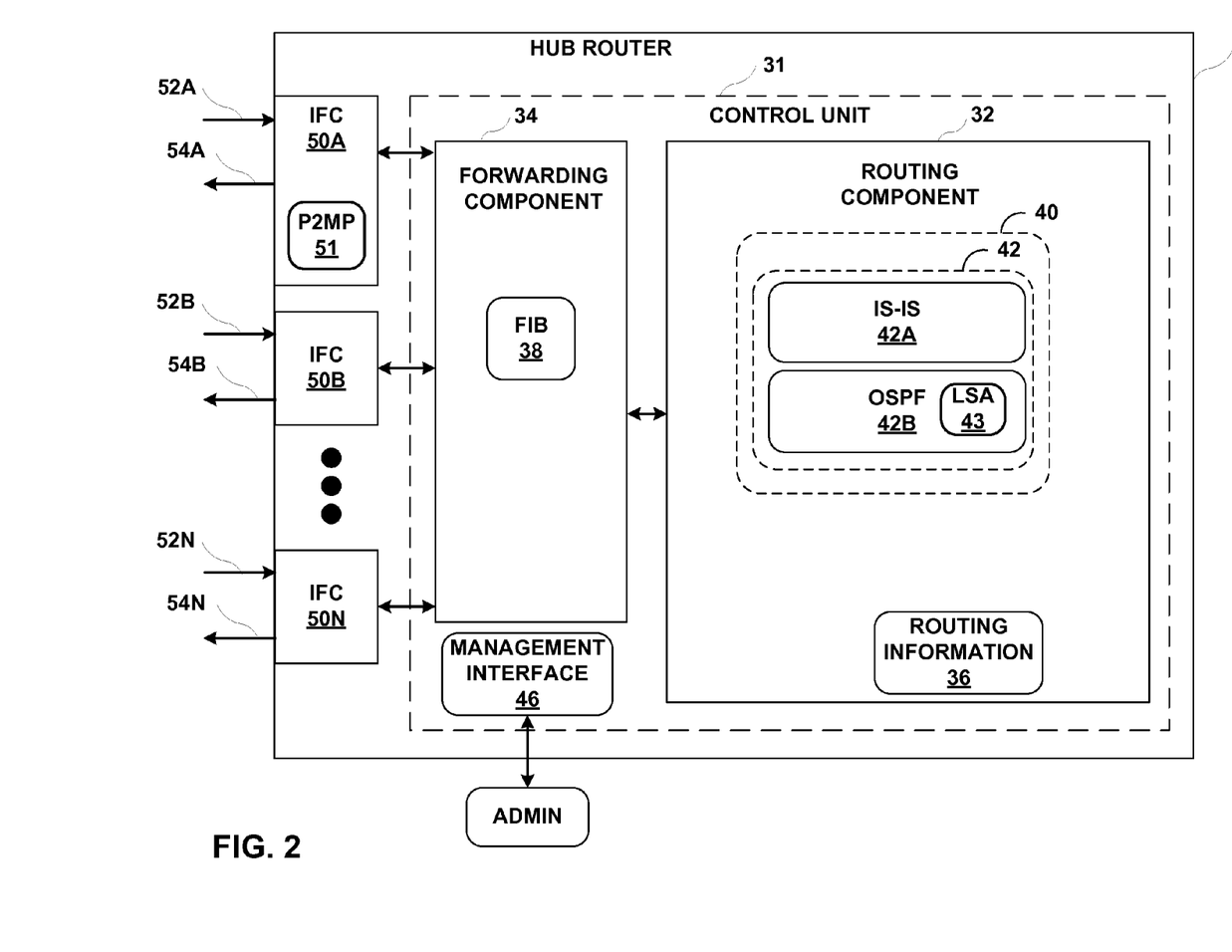
FIG. 2 is a block diagram illustrating an exemplary embodiment of the hub router shown in FIG. 1 that may perform various aspects of the techniques described in this disclosure.

FIG. 2 is a block diagram illustrating an exemplary embodiment of hub router 6 that may perform various aspects of the techniques described in this disclosure. In the example of FIG. 2, hub router 6 includes a control unit 31 that comprises a routing component 32 and a forwarding component 34. In addition, hub router 6 includes a set of interface cards (IFCs) 50A-50N (collectively, "IFCs 50") for communicating packets via inbound links 52A-52N (collectively, "inbound links 52") and outbound links 54A-54N (collectively, "outbound links 54").

Routing component 32 primarily provides an operating environment for control plane protocols 40. Routing component 32 may also be referred to as "control plane 32" in that routing component 32 provides an operating environment in which control plane protocols 40 and other control plane operations may be performed. For example, one or more interior gateway protocol (IGP) routing protocols 42, such as Intermediate System to Intermediate System (ISIS) routing protocol 42A, or the Open Shortest Path First (OSPF) routing protocol 42B, maintain a representation of the current topology of hub-and-spoke network 2 (i.e., shown as routing information 36 in the example of FIG. 2) and other network entities to which hub router 6 is connected. In particular, IGPs 42 update routing information 36 to accurately reflect the topology of the network and other entities. Hub router 6 may include other example routing protocols such as Border Gateway Protocol (BGP) to provide one example.

Routing component 32 generates and programs forwarding component 34 with FIB 38 that associates network destinations with specific next hops and corresponding interfaces ports of IFCs 50 in accordance with routing information 36. Routing component 32 may generate FIB 38 in the form of a radix tree having leaf nodes that represent destinations within the network, for example.

Based on FIB 38, forwarding component 34 forwards packets received from inbound links 52A-52N to outbound links 54A-54N that correspond to next hops associated with destinations of the packets. U.S. Pat. No. 7,184,437 provides details on an exemplary embodiment of a router that utilizes a radix tree for route resolution. The entire contents of U.S. Pat. No. 7,184,437 are incorporated herein by reference.

In one example, forwarding component 34 is a rich and dynamic shared forwarding plane, optionally distributed over a multi-chassis router. Moreover, forwarding component 34 may be provided by dedicated forwarding integrated circuits normally associated with high-end routing components of a network router. Further details of one example embodiment of PLR router 30 can be found in U.S. Pat. No. 8,339,939, issued Dec. 25, 2012, entitled "STREAMLINED PACKET FORWARDING USING DYNAMIC FILTERS FOR ROUTING AND SECURITY IN A SHARED FORWARDING PLANE," the entire contents of which are incorporated herein by reference.

An administer ("admin") may interface with a management interface 46 executed by control unit 31 of hub router 6 to configure IGP routing protocols 42. IGP routing protocols 42 may include multi-instance versions of the respective IGP routing protocols 42, including the OSPFv2 Multi-Instance Extensions described by the above incorporated RFC 6549. Focusing on OSPF 42B for purposes of illustrating the techniques, the administrator may configure OSPF 42B to support the multi-instance extensions.

In accordance with the techniques described in this disclosure, the administrator may configure OSPF 42B to utilize the separate OSPF instances 14A and 14B between hub router 6 and respective spoke routers 10A and 10B. The administrator may not configure the multi-instance version of OSPF 42BB to fully conform with RFC 6549 in that the administrator may not specify the so-called "instance ID" set forth in RFC 6549 for each of the instances 14A and 14B. Instead, each instance 14A and 14B may be identified by a source router ID and a destination router ID, which is possible given that each instance only includes hub router 6 and a different one of spoke routers 10 (but never more than one of spoke routers 10). As a result, the tuple formed as a function of the source router ID and the destination router ID is unique within the context of the hub-and-spoke network 2 and a separate instance ID is not required to derive to which instance any given LSA is associated.

In configuring the multi-instance version of OSPF 42B, the administrator may configure a logical point-to-multipoint (P2MP) interface within one of IFCs 50 (such as P2MP interface 51 configured within IFC 50A). The administrator may configure P2MP interface 51 ("P2MP 51") such that a received hello/link state (LS) update ("LSupdate") packet may be classified as belonging to one of instances 14 keyed by the source router ID of the packet and the router ID of the receiving node (which may be referred to as the destination router ID). The administrator may enter the following commands via management interface 46 to configure the multi-instance version of OSPF 42B within hub router 6:

+ [protocols ospf area 0 interface st0.0]virtual-multi-instance
[protocols ospf area 0 interface st0.0]interface-type p2mp
[protocols ospf area 0 interface st0.0]dynamic-neighbors The administrator may enter similar commands to those listed above at each of hub router 6 and spoke routers 10 to configure the multi-instance version of OSPF 42B. The foregoing commands allow the P2MP interface 51 to support each of the different instances 14 via a single IFC 50.

Once configured to support the multi-instance version of OSPF 42B, OSPF 42B may generate a link state advertisement (LSA) 43 ("LSA 43") for each one of instances 14. LSA 43 for instance 10A may advertise the route between hub router 6 and spoke router 10A. LSA 43 for instance 10B may advertise the route between hub router 6 and spoke router 10B. OSPF 42B may flood each of LSAs 43 throughout the respective one of instances 14 but not outside of each of the respective one of instances 14. The route advertised by each of LSAs 43 may be referred to as a "default route" as the route may represent the only route that the spoke routers 10 require for proper forwarding within hub-and-spoke network 2.

Although described as specifying the default router via LSAs 43, spoke routers 10 may be configured with a default route in a number of different ways. For example, the administrator may statically configure the default route. For example, the administrator may configure a static route 0.0.0.0/0 pointing towards the hub. Static routes however may not be configured in instances where there are multiple hub routers 6 (which may be preferred for high availability networks that provide redundancy in case of failures in one hub router), as static routes do not facilitate dynamic route changes to redirect to the backup hub router. The administrator may therefore prefer to configure hub router 6 to utilize aggregate routes, which are advertised via LSAs 43. Spoke routers 10 may receive LSAs 43 specifying the aggregate routes as external routes and install the routes in their respective routing information 36 (which may also be referred to as a "routing information base 36" or "RIB 36").

The administrator may configure the aggregate routes via the management interface 46 by, as one example, entering the following commands:

Ex: set routing-options aggregate route 10.200.0.0/16
    Set protocols ospf export export-aggregare
    Set policy-options policy-statement export-aggregate term 1 from aggregate
    Set policy-options policy-statement export-aggregate term 1 then accept Aggregate routes may overcome the issue of static routes in the context of multiple hub routers as OSPF 42B as each of spoke routers 10 may define a primary and secondary hubs, installing the default routes with higher/lower preferences. Yet, aggregate routes may increase the administrative complexity in terms of requiring a disciplined IP address assignment at spoke routers 10 so as to keep the range within summarization boundaries. In this regard, aggregate routes may be operationally cumbersome in terms of maintaining the IP address pool.

To overcome the difficulties associated with aggregate routes, the administrator may configure OSPF 42B within each of spoke routers 10 to identify adjacencies with hub router 6 and download default routes toward the primary and any backup (or, in other words, secondary) hub routers 6. Downloaded default routes may be similar to static routes with the added benefit of ensuring connectivity (in that secondary or backup routes may also be downloaded) while also being dynamic in terms of being added and removed depending on the status of the adjacent link.

Once configured to support the multi-instance version of OSPF 42B in accordance with the techniques described in this disclosure, OSPF 42B of hub router 6 may begin receiving LSAs 43 from each of spoke routers 10 advertising topology changes within each of spoke site networks 12. OSPF 42B of hub router 6 may process the LSAs 43 to maintain the representation of the topology of hub-and-spoke network 2 (which is represented by routing information 36). OSPF 42B may maintain the topology of each of spoke site networks 12 within the same routing table similar to a non-forwarding instance, despite that the topology of one or more of spoke site networks 12 is advertised via a different instance 14.

In this respect, hub router 6 effectively maintains the representation of the topology of hub-and-spoke network 2 on behalf of spoke routers 10, which only maintain a representation of each of their respective local spoke networks (which may refer to spoke site network 12A and 12B for spoke router 10A and spoke site network 12C for spoke router 10B). In other words, hub router 6 may in the example of FIG. 2 represent the only one of routers 6 and 10 that maintains the full topology of hub-and-spoke network 2, while spoke routers 10 each maintain a local spoke site topology to facilitate local routing of packets within each of the local spoke site networks. For inter-spoke router forwarding, each of spoke routers 10 are configured to utilize, in this example, the default route discussed above, sending all inter-spoke router traffic to hub router 6 (as each of spoke routers 10 is not aware of each other given that only one spoke router 10 resides in each of separate instances 14). Hub router 6 may receive the traffic and forward the traffic according to the full topology (as represented by next hops of forwarding information base, which may be denoted as FIB 38 in the example of FIG. 2). Separate instances 14 may therefore promote proper hub-and-spoke forwarding while also potentially reducing the number of LSA 43 that are flooded between spoke routers 10.

Figure 3:
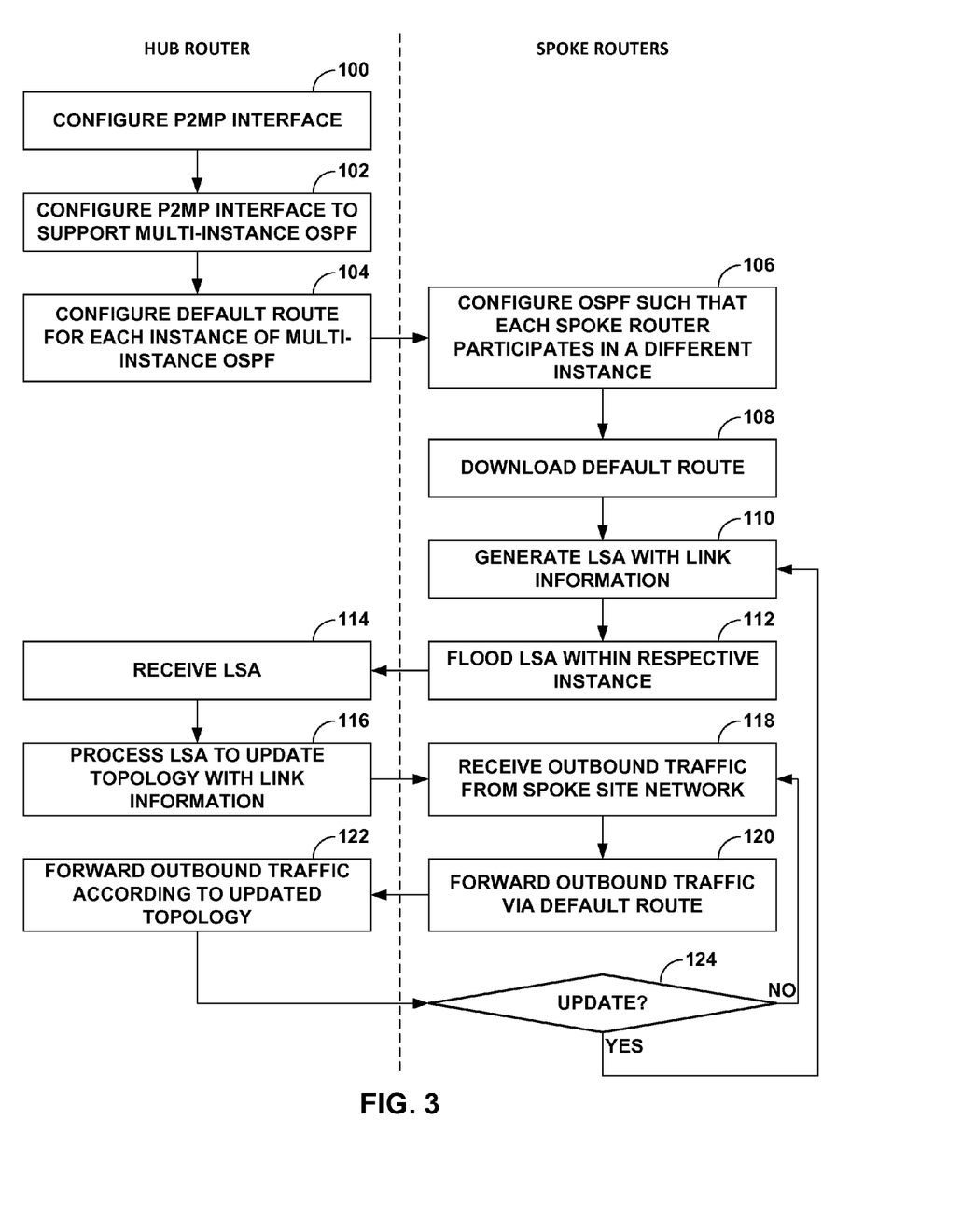
FIG. 3 is a flowchart illustrating exemplary operation of a hub router and spoke routers in performing various aspects of the techniques described in this disclosure.

FIG. 3 is a flowchart illustrating exemplary operation of hub router 6 and spoke routers 10 in performing various aspects of the techniques described in this disclosure. Initially, an administrator may, as described above, configure hub router 6 via management interface 46 to provide P2MP interface 51 (100). The administrator may further configure P2MP interface 51 of hub router 6 via management interface 46 to support multi-instance OSPF 42B (102). The administrator may, when configuring the multi-instance OSPF 42B, configure a default route between hub router 6 and each of spoke routers 10, specifying the default route for each corresponding one of instances 14 (104). Once instances 14 are configured, the administrator may deploy or otherwise enable hub router 6 to act as the hub for hub-and-spoke network 2.

The administrator may likewise configure OSPF (which may be substantially similar to OSPF 42B of hub router 6) for each of spoke routers 10 such that each one of spoke routers 10 participates in a different one of instances 14 (106). In the deployment of OSPF 42B for hub-and-spoke network 2 shown in the example of FIG. 1, OSPF 42B of the spoke routers 10 may be configured normally. Upon configuring OSPF 42B for each of spoke routers 10, the administrator may deploy or otherwise enable each of spoke routers 10 to act as a spoke for hub-and-spoke network 2.

Spoke routers 10 may each download the previously configured default route from hub router 6 (108). Spoke routers 10 may install the default route within respective routing information (which may be similar to routing information 36 of hub router 6) and FIB (as a next hop where the FIB may be similar to FIB 38 of hub router 6). Spoke routers 10 may then proceed to generate LSAs with link information describing the topology of spoke site networks 12 (110). Spoke routers 10 may flood the LSAs within each of respective instances 14 (112).

Hub router 6 may receive the LSAs (114), processing the LSA to update the topology stored to routing information 36 with the link information specified in the LSAs (116). Hub router 6 however does not forward the LSA on to any other one of spoke routers 10 given that these spoke routers 10 participate in a different instance 14. The spoke routers 10 may receive outbound traffic from spoke site networks 12 (118). Outbound traffic may refer to traffic originated from spoke site networks 12 destined for another spoke site network 12 associated with a different one of spoke routers 10. As such, the spoke routers 10 may forward all outbound traffic via the default route to hub router 6 (120). Hub router 6 may forward outbound traffic according to the updated topology (122). That is, hub router 6 may process the LSAs to update the topology stored within routing information 36 with the link information and reduce the updated topology down to next hops indicating a next hop for traffic to be forwarded. Hub router 6 may forward the outbound traffic according to the updated topology by, at least in part, forwarding the outbound traffic according to a next hop associated with the destination addresses of the outbound traffic.

Spoke routers 10 may continually identify whether an update to the topology has occurred (124). When an update occurs as indicated by an LSA from a device located within spoke site networks 10, spoke routers 10 may each generate an LSA with the appropriate link information indicated the update and flood the LSA within the respective one of instances 14 so that hub router 6 may receive and process the LSA to update the topology with the link information ("YES" 124, 110-116). Outbound traffic may then be forwarded via the updated topology after being forwarded via the default route to hub router 6 (118-122). When no update occurs, the spoke routers 10 may continue to forward outbound traffic via the default route while hub router 6 forwards the outbound traffic via the associated next hop ("NO" 124, 118-122).

Figure 4:
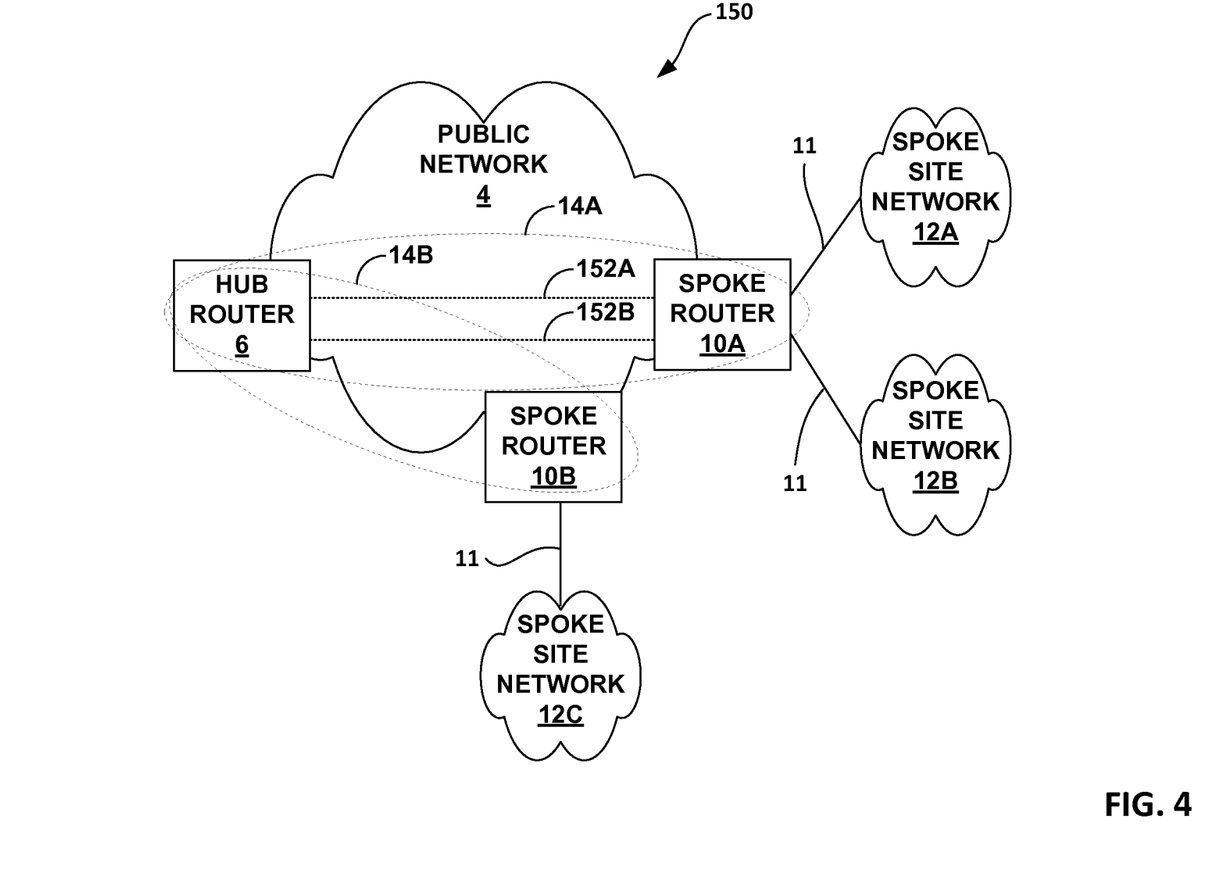

FIG. 4 is a block diagram illustrating another example virtual private network (VPN) 150 configured in a hub-and-spokes topology. Hub-and-spoke network 150 may be substantially similar to hub-and-spoke network 2 shown in the example of FIG. 1 except that hub router 6 is coupled to spoke router 10A via links 152A and 152B. Links 152A and 152B may represent physical links or virtual links (such as an Internet Protocol security (IPsec) tunnel). Because the router IDs (rather than an instance ID) are used as the lookup keys to the topology specific to a given instance in routing information 36, the two OSPF adjacencies formed over links 152A and 152B are within the same instance 14A (because both links 152A and 152B are associated with the same hub router and spoke router 10A. Hub router 6 and spoke router 10A may be coupled via multiple links 152A and 152B to provide high availability, increased throughput or both high availability and increased throughput.

When links 152A and 152B are configured to provide high availability, the administrator may configure hub router 6 to define multiple default routes, one for each of links 152A and 152B. In particular, the administrator may configure multiple P2MP interfaces to support the multiple links. The administrator may also specify one of the default routes as the primary route and the other default route as a secondary or backup route.

The administrator may enter the following commands to configure the primary route for the primary interface:

```
+ [protocols ospf area 0 interface st0.0]virtual-multi-instance
  [protocols ospf area 0 interface st0.0]interface-type p2mp
  [protocols ospf area 0 interface st0.0]dynamic-neighbors
  [protocols ospf area 0 interface st0.0]metric 1
```

The administrator may enter the following commands to configure the default route for the secondary interface:

```
+ [protocols ospf area 0 interface st0.1]virtual-multi-instance
  [protocols ospf area 0 interface st0.1]interface-type p2mp
  [protocols ospf area 0 interface st0.1]dynamic-neighbors
  [protocols ospf area 0 interface st0.1]metric 10
```

In the foregoing commands, the metric for each of the primary and secondary interface indicates that one is primary (with a lower metric of 1) and the other is secondary (with a higher metric of 10).

Alternatively, when configuring links 152A and 152B to support high availability, the administrator may configure hub router 6 to use another link as a backup link that can be downloaded to FIB 38 (which may also reside within a so-called packet forwarding engine or, as often referred to, a PFE) and installed as a backup next hop. Pre-installing the backup link in this manner may allow for faster recover in case of link failure. Because links 152A and 152B reside within the same instance, i.e., instance 14A in the example of FIG. 4, hub router 6 may calculate and install backup next hops to allow for fast recovery relative to having to calculate and install the backup next hop after detecting the failure.

When links 152A and 152B are configured to provide increased throughput, the administrator may configure to allow for equal cost multi-path (ECMP). ECMP allows for both of links 152A and 152B to be used for traffic delivery, where traffic is load balanced across both of links 152A and 152B. Utilizing both of links 152A and 152B rather than a single link allows for increased traffic throughput. Because links 152A and 152B reside within the same instance, i.e., instance 14A in the example of FIG. 4, hub router 6 may utilize both of links 152A and 152B in the ECMP configuration to forward traffic. The administrator may define these links as ECMP links when specifying the default routes, where these default routes may include ECMP next hops. Spoke router 10A downloads the default route and may utilize the ECMP next hops to forward outbound traffic to hub router 6.

Figure 5:
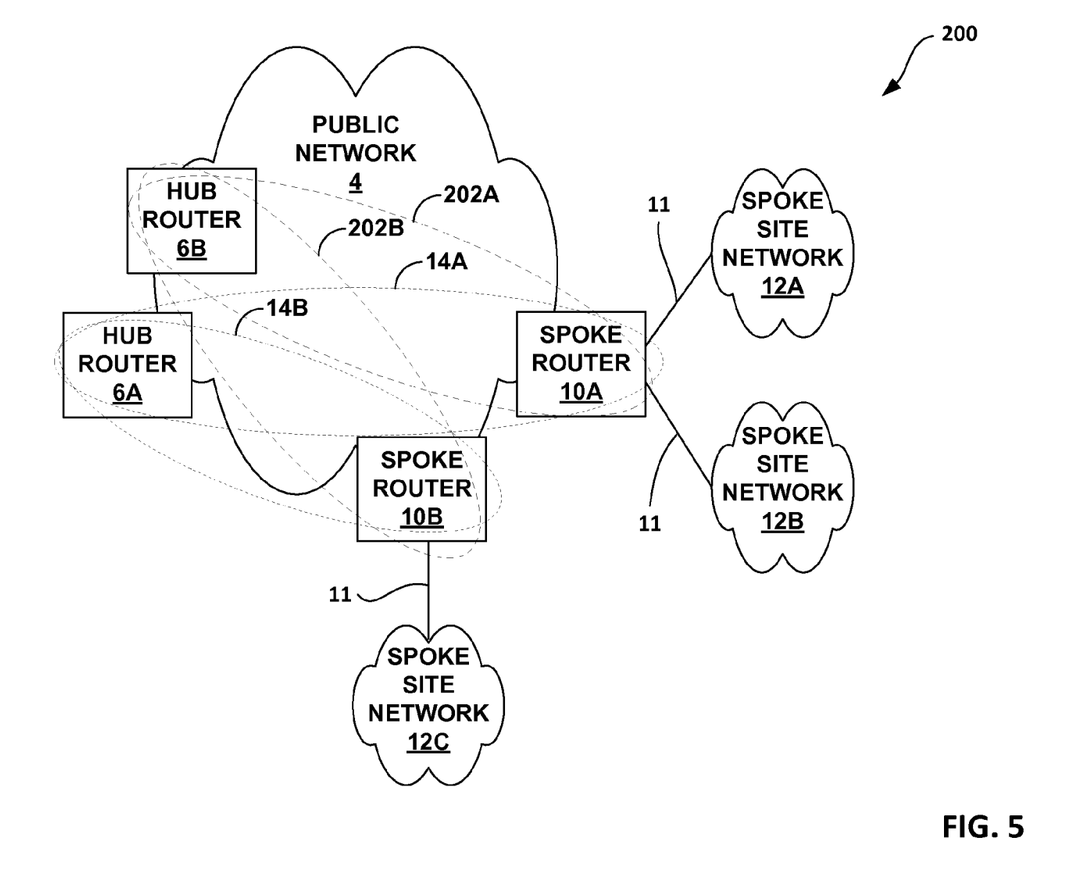

FIG. 5 is a block diagram illustrating another example virtual private network (VPN) 200 configured in a hub-and-spokes topology. Hub-and-spoke network 200 may be substantially similar to hub-and-spoke network 2 shown in the example of FIG. 1 except that hub-and-spoke network 200 may include two hub routers 6A and 6B. Each of hub routers 6A and 6B may be substantially similar to hub router 6 described above with respect to the examples of FIGS. 1 and 2.

Two or more hub routers may be utilized in a single hub-and-spoke network to provide high availability. In other words, multiple hub routers may provide redundancy such that when one of hub routers 6A or 6B fails, goes down or taken offline for maintenance purposes, the other one of the hub routers 6A or 6B may be configured as the primary hub router and the other may be configured (when functioning properly) as the secondary hub router.

With the virtual multi-instancing techniques described in this disclosure, each one of spoke routers 10 is configured to have a separate OSPF instance with each of hub routers 6A and 6B. OSPF 42B of each of spoke routers 10, once configured, may download all of the routes learned from the primary hub of hub routers 6A and 6B with a lower metric (or, in other words, higher preference) and the ones learned from the secondary one of hub routers 6A and 6B with a higher relative metric (or, in other words, lower preference). The administrator may configure these default routes by entering the following exemplary commands via management interface 46:

```
+ [protocols ospf area 0 interface st0.0]
                                        virtual-multi-instance{
                                        primary-hub x.x.x.x;
                                        secondary-hub y.y.y.y;
                                        generate-default-route;
                                        }
```

The administrator may configure each of spoke routers 10 in a manner similar to hub router 6 so as to support the multi-instance version of OSPF 42B. In other words, the administrator may configure an interface 50 of each of spoke routers 10 to provide a logical P2MP interface similar to P2MP interface 51 of hub router 6. The administrator may then configure the P2MP interface 51 to support multi-OSPF instances. In the example of FIG. 5, the administrator may configure the P2MP interface 51 of spoke router 10A to support instances 14A and 202A. The administrator may also configure the P2MP interface 51 of spoke router 10B to support instances 14B and 202B. Once configured, spoke routers 10 may each download the default routes. The virtual multi-instance nodes (e.g., spoke routers 10A and 10B) may perform one-hop shortest path first (SPF) on the virtual instances. The virtual-multi-instance nodes may not calculate paths beyond one hop in the virtual multi-instances.

As further shown in the example of FIG. 5, hub routers 6A and 6B are not in a separate OSPF instance. Moreover, hub routers 6A and 6B do not share routes or otherwise flood LSAs between each other. Hub routers 6A and 6B do not share routes or otherwise flood LSAs (to communicate link information) because each of hub routers 6A and 6B maintains a separate representation of the topology and participate in fully redundant OSPF instances (relative to one another). That is, hub router 6A has the same number of instances 14 and 202 between the same set of spoke routers 10 as hub router 6B and hub router 6*b* has the same number of instances 14 and 202 between the same set of spoke routers 10 as hub router 6A.

Furthermore, hub-and-spoke networks are growing rapidly. When there are a large number of spokes in the hub-and-spoke network 200 (e.g., in terms of tens of thousands), hub routers 6A and 6B may be deployed in a manner that allows for load balancing where half of spoke routers 10 use one of hub routers 6A and 6B as a primary hub while the other half of spoke routers 10 use the other one of hub routers 6A and 6B as a primary.

Figure 6:
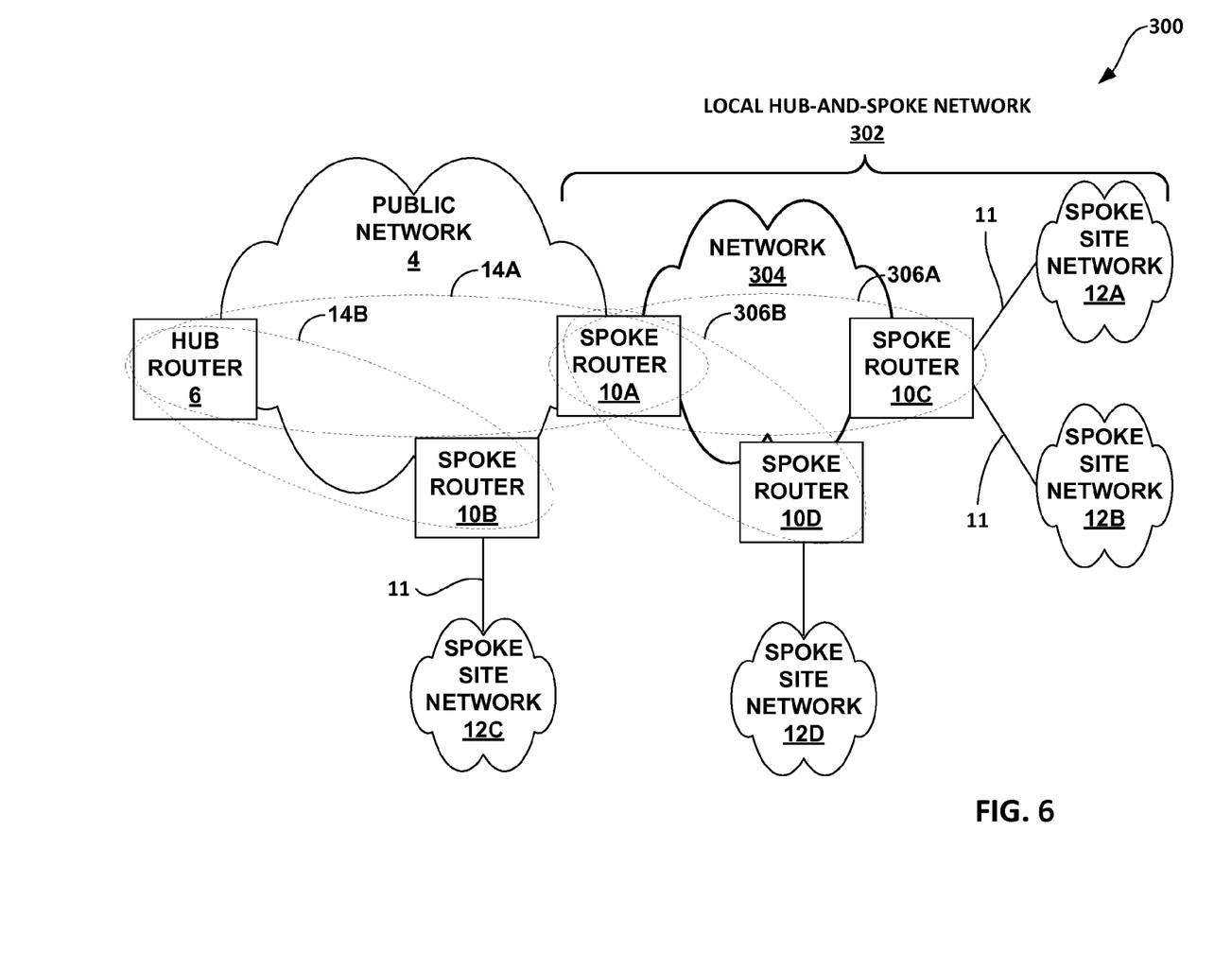

FIG. 6 is a block diagram illustrating another example virtual private network (VPN) 300 configured in a hub-and-spokes topology. Hub-and-spoke network 300 may be substantially similar to hub-and-spoke network 2 shown in the example of FIG. 1 except that hub-and-spoke network 300 is a hierarchical hub-and-spoke network 300 in which one of spoke routers 10, i.e., spoke router 10A in the example of FIG. 6, acts as a hub for a local hub-and-spoke network 302.

Hierarchical hub-and-spoke network 300 may enable scaling of spokes to potentially a million or more. Local hub-and-spoke network 302 may represent a hub-and-spoke network within a larger hub-and-spoke network 300. Hub router 6 may represent a hub for the hierarchical hub-and-spoke network 300, while spoke router 10A may act as a local hub for local hub-and-spoke network 302.

As shown in the example of FIG. 6, local hub-and-spoke network 302 may include a network 304 over which the local hub-and-spoke VPN 302 may be configured. Network 304 may represent a private or public network. Spoke router 10A may still download the default route and otherwise operate as described above with respect to hub router 6 and separate instance 14A. However, the administrator may further configure spoke router 10A in a manner similar to that described above with respect to hub 6 and FIGS. 1 and 2 to act as the local hub for the local hub-and-spoke network 302. The administrator may configure spoke router 10A, in other words, to provide a P2MP interface 51 in support of separate OSPF instances 306A and 306B between spoke routes 10C and spoke routers 10D of the local-hub and-spoke network 302. The administrator may also define default routes for each one of instances 306A and 306B. Spoke routers 10C and 10D of local-hub-and-spoke network 304 may be configured similar to either of spoke routers 10A and 10B as described above with respect to the example of FIG. 1.

Figure 7A:
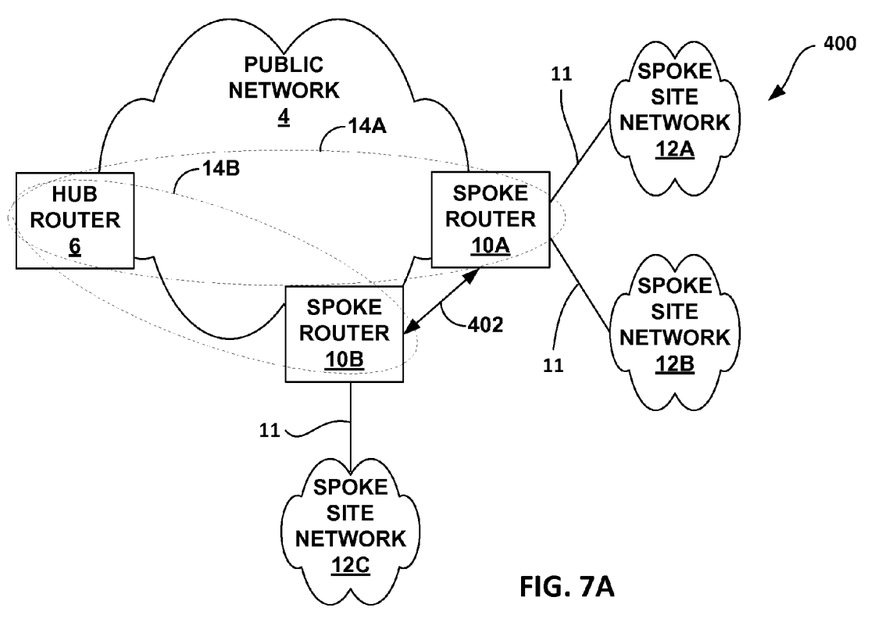
Figure 7B:
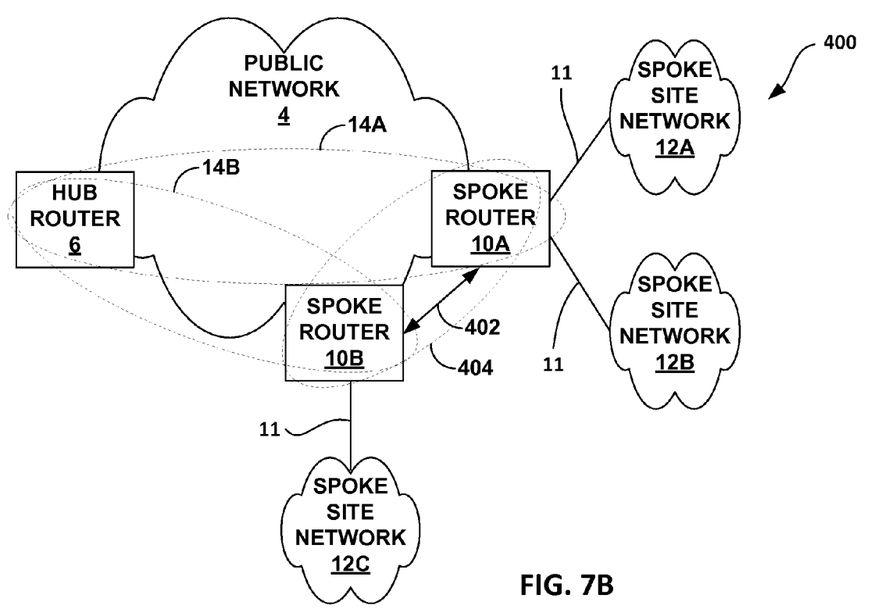

FIGS. 7A and 7B are block diagrams illustrating another example virtual private network (VPN) 400 configured in a hub-and-spokes topology. Referring first to the example of FIG. 7A, hub-and-spoke network 400 may be substantially similar to hub-and-spoke network 2 shown in the example of FIG. 1 except that hub-and-spoke network 400 may support auto discovery VPNs (ADVPN). More information regarding ADVPNs can be found in IPSECME Working Draft entitled "Auto Discovery VPN Protocol," with document identifier draft-sathyanarayan-ipsecme-advpn-00, dated Jul. 5, 2013, the entire contents of which are hereby incorporated by reference in its entirety.

ADVPNs allow for dynamic IPsec tunneling between two devices, such as spoke routers 10A and 10B. ADVPNs may be utilized when there is a large amount of traffic to be sent from one spoke to the other so as to bypass hub router 6, reducing traffic overhead at hub router 6. When intended to perform dynamic tunneling, the administrator may configure each of spoke routers 10 similar to hub router 6 (meaning to support the multi-instance OSPF techniques described in this disclosure). Once configured, spoke routers 10 may establish tunnel 402 in accordance with ADVPN processes. When the tunnel is established, OSPF 42B of each of spoke routers 10 may detect the new tunnel as a new link and establish a separate instance between spoke routers 10. The separate instance is shown as instance 404 in the example of FIG. 7B.

OSPF 42B of spoke routers 10 may determine that instance 404 is to be configured as a result of a lookup in their respective routing information 36 using the router ID pair formed from the router ID assigned to each of spoke router 10A and 10B. When the route ID pair is not found in routing information 36, OSPF 42B of one of spoke routers 10A and 10B may instantiate a new instance 404. In some examples, one of spoke routers 10A and 10B (such as spoke router 10A for example) may initiate tunnel 402, add new instance 404 to routing information 36, and send a hello or other periodic message. The other one of spoke routers 10A and 10B (e.g., spoke router 10B) may detect the tunnel and add new instance 404 to routing information 36 of spoke router 10B. When tunnel 402 is torn down or otherwise disabled, both of spoke routers 10A and 10B may remove instance 404 and tunnel 402 from respective routing information 36 of each of spoke routers 10A and 10B. The creation and deletion of tunnel 402 may not however result in flooding of LSAs throughout hub-and-spoke network 2 given that tunnel 402 is isolated within a separate OSPF instance 404, which limits flooding of LSAs to instance 404 (and therefore between spoke routers 10A and 10B).

The techniques may generally provide the following operation within any of the foregoing hub-and-spoke networks. With regard to sending and receiving of OSPF messages, router link state advertisement (LSA) for the virtual multi-instance may include the links belonging only to virtual multi-instance. LSAs may be flooded on the interfaces or neighbors belonging to the virtual multi-instance. On receiving an OSPF message on an interface with a virtual multi-instance feature enabled, based on source router-id and destination router-id messages are directed to the corresponding instance. New instances may be spawned when there is no corresponding instance.

With regard to shortest path first calculation to resolve the routing information and identify paths by which to transmit packets, a separate SPF calculation may be done for each virtual instance. The SPF calculation may be done for one-hop. Routes may be calculated for each virtual instance separately.

With regard to route redistribution, routes from one virtual instance should not be leaked into each other unless explicitly configured to do so via local policies. Routes from the virtual instance may be leaked into the default instance. The routes from the virtual instances may be summarized before exporting into a default instance.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various aspects of this disclosure have been described. These and other aspects are within the scope of the following claims.

The invention claimed is:

1. A method comprising:
configuring a hub router acting as a hub in a hub-and-spoke network to utilize a separate instance of a multi-instance version of a link state protocol to communicate with each of a plurality of spoke routers of the hub-and-spoke network, each separate instance of the multi-instance version of the link state protocol corresponding to a different routing domain and including the hub router and a different one of the plurality of spoke routers;
identifying to which of the separate instances each of the link state advertisements corresponds based on a source router identifier and a destination router identifier specified by each of the link state advertisements and not based on a separate instance identifier; and
processing, by the hub router, link state advertisements from the separate instances of the multi-instance version of the link state protocol to update a portion of a representation of a topology of the hub-and-spoke network corresponding to the separate instances identified by the source router identifier and the destination router identifier specified by each of the link state advertisements.

2. The method of claim 1, wherein processing the link state advertisements comprises processing the link state advertisements to maintain the representation of the topology of the hub-and-spoke network on behalf of the plurality of spoke routers.

3. The method of claim 1, wherein processing the link state advertisements comprises processing the link state advertisements from the separate instances without flooding the link state advertisements to the plurality of the spoke routers.

4. The method of claim 1, wherein configuring the hub router to utilize the separate instances comprises configuring an interface of the hub router to be a logical point-to-multipoint (P2MP) interface, the logical P2MP interface configured to support each separate instance of the multi-instance version of the link state protocol.

5. The method of claim 1,
wherein the hub router is coupled to one of the plurality of spoke routers by two or more links, and
wherein the separate instance between the hub router and the one of the plurality of spoke routers includes the two or more links.

6. The method of claim 5, wherein configuring the hub router to utilize the separate instance between the hub router and the one of the plurality of spoke routers comprises configuring the hub router to utilize the separate instance between the hub router and the one of the plurality of spoke router such that a first one of the two or more links is a primary link and a second one of the two or more links is a backup link.

7. The method of claim 5, wherein configuring the hub router to utilize the separate instance between the hub router and the one of the plurality of spoke routers comprises configuring the hub router to utilize the separate instance between the hub router and the one of the plurality of spoke router such that load balancing is performed to balance traffic loads across the two or more links.

8. The method of claim 1, further comprising:
generating a link state advertisement for each of the separate instances specifying an aggregate route between the hub router and the respective one of the plurality of spoke routers, the aggregate router to be installed by the respective one of the plurality of spoke routers so as to enable communications from the respective one of the plurality of spoke routers and the hub router;
flooding each of the generated link state advertisements within each of the corresponding ones of the separate instances.

9. The method of claim 1, wherein the hub router is a first hub router acting as a first hub in the hub-and-spoke, and wherein the method further comprises
configuring a second hub router acting as a second hub in the hub-and-spoke network to utilize a separate instance of the multi-instance version of the link state protocol to communicate with each of the plurality of spoke routers of the hub-and-spoke network, each separate instance of the multi-instance version of the link state protocol including the second hub router and a different one of the plurality of spoke routers;
processing, by the second hub router, link state advertisements from the separate instances of the multi-instance version of the link state protocol configured to be utilized by the second hub router to maintain the representation of the topology of the hub-and-spoke network.

10. The method of claim 1, wherein the hub-and-spoke network comprises a hierarchical hub-and-spoke network comprising at least one local hub-and-spoke network in which one of the plurality of spoke routers acts as a hub for the local hub-and-spoke network.

11. The method of claim 1, wherein the link state protocol comprises an open shortest path first (OSPF) link state protocol.

12. A hub router configured to act as a hub in a hub-and-spoke network, the hub router comprising:
a memory configured to store a representation of a topology of the hub-and-spoke network; and
one or more processors configured to utilize a separate instance of a multi-instance version of a link state protocol to communicate with each of a plurality of spoke routers of the hub-and-spoke network, each separate instance of the multi-instance version of the link state protocol corresponding to a different routing domain and including the hub router and a different one of the plurality of spoke routers, identify to which of the separate instances each of the link state advertisements corresponds based on a source router identifier and a destination router identifier specified by each of the link state advertisements and not based on a separate instance identifier, and process link state advertisements from the separate instances of the multi-instance version of the link state protocol to update a portion of the representation of the topology of the hub-and-spoke network corresponding to the separate instances identified by the source router identifier and the destination router identifier specified by each of the link state advertisements.

13. The hub router of claim 12, wherein the one or more processors are configured to process the link state advertisements to maintain the representation of the topology of the hub-and-spoke network on behalf of the plurality of spoke routers.

14. The hub router of claim 12, wherein the one or more processors are configured to process the link state advertisements from the separate instances without flooding the link state advertisements to the plurality of the spoke routers.

15. The hub router of claim 12, wherein the one or more processors are configured to configure an interface of the hub router to be a logical point-to-multi-point (P2MP) interface, the logical P2MP interface configured to support each separate instance of the multi-instance version of the link state protocol.

16. The hub router of claim 12,
wherein the hub router is coupled to one of the plurality of spoke routers by two or more links, and
wherein the separate instance between the hub router and the one of the plurality of spoke routers includes the two or more links.

17. The hub router of claim 16, wherein the one or more processors are configured to utilize the separate instance between the hub router and the one of the plurality of spoke router such that a first one of the two or more links is a primary link and a second one of the two or more links is a backup link.

18. The hub router of claim 16, wherein the one or more processors are configured to utilize the separate instance between the hub router and the one of the plurality of spoke router such that load balancing is performed to balance traffic loads across the two or more links.

19. The hub router of claim 12, wherein the one or more processors are further configured to generate a link state advertisement for each of the separate instances specifying an aggregate route between the hub router and the respective one of the plurality of spoke routers, the aggregate router to be installed by the respective one of the plurality of spoke routers so as to enable communications from the respective one of the plurality of spoke routers and the hub router, and flood each of the generated link state advertisements within each of the corresponding ones of the separate instances.

20. The hub router of claim 12, wherein the hub-and-spoke network comprises a hierarchical hub-and-spoke network comprising at least one local hub-and-spoke network in which one of the plurality of spoke routers acts as a hub for the local hub-and-spoke network.

21. The hub router of claim 12, wherein the link state protocol comprises an open shortest path first (OSPF) link state protocol.

22. A non-transitory computer-readable storage medium having stored thereon instructions that, when executed, cause one or more processors to:
configure a hub router acting as a hub in a hub-and-spoke network to utilize a separate instance of a multi-instance version of a link state protocol to communicate with each of a plurality of spoke routers of the hub-and-spoke network, each separate instance of the multi-instance version of the link state protocol corresponding to a different routing domain and including the hub router and a different one of the plurality of spoke routers;
receive link state advertisements from the separate instances of the multi-instance version of the link state protocol;
identify to which of the separate instances each of the link state advertisements corresponds based on a source router identifier and a destination router identifier specified by each of the link state advertisements and not based on a separate instance identifier; and
process the link state advertisements to maintain a representation of a topology of the hub-and-spoke network.

23. A system comprising:
a hub router configured to act as a hub in a hub-and-spoke network;
a plurality of spoke routers, each of which is configured to act as a spoke in the hub-and-spoke network,
wherein the hub router includes:
a memory configured to store a representation of a topology of the hub-and-spoke network; and
one or more processors configured to utilize a separate instance of a multi-instance version of a link state protocol to communicate with each of the plurality of spoke routers of the hub-and-spoke network, each separate instance of the multi-instance version of the link state protocol corresponding to a different routing domain and including the hub router and a different one of the plurality of spoke routers, identify to which of the separate instances each of the link state advertisements corresponds based on a source router identifier and a destination router identifier specified by each of the link state advertisements and not based on a separate instance identifier, and process link state advertisements from the separate instances of the multi-instance version of the link state protocol to update a portion of the representation of the topology of the hub-and-spoke network corresponding to the separate instances identified by the source router identifier and the destination router identifier specified by each of the link state advertisements.

24. The system of claim 23,
wherein the hub-and-spoke network comprises a hierarchical hub-and-spoke network comprising at least one local hub-and-spoke network in which one of the plurality of spoke routers acts as a hub for the local hub-and-spoke network,
wherein the local hub-and-spoke network includes a plurality of local spoke routers; and
wherein the one of the plurality of spoke routers acting as the hub for the local hub-and-spoke network includes one or more processors configured to utilize a separate instance of the multi-instance version of the link state protocol to communicate with each of the plurality of local spoke routers of the hub-and-spoke network, each separate instance of the multi-instance version of the link state protocol including the spoke router acting as the hub for the local hub-and-spoke network and a different one of the plurality of local spoke routers.

25. The system of claim 23, wherein a first one of the plurality of spoke routers includes one or more processors configured to establish a dynamic tunnel between a second one of the plurality of spoke routers and establish a new instance of the multi-instance version of the link state protocol to include only the first one of the plurality of spoke routers and the second one of the plurality of spoke routers.

26. The system of claim 23,
wherein the hub router comprises a first hub router,
wherein the system comprises a second hub router, and
wherein the second hub router includes one or more processors configured to utilize a separate instance of the multi-instance version of the link state protocol to communicate with each of the plurality of spoke routers of the hub-and-spoke network, each separate instance of the multi-instance version of the link state protocol including the second hub router and the different one of the plurality of spoke routers.

* * * * *